US012101452B2

United States Patent
Ma

(10) Patent No.: US 12,101,452 B2
(45) Date of Patent: Sep. 24, 2024

(54) COLOR ENHANCEMENT METHOD, IMAGE-FORMING APPARATUS, AND STORAGE MEDIUM

(71) Applicant: Zhuhai Pantum Electronics Co., Ltd., Zhuhai (CN)

(72) Inventor: Yangxiao Ma, Zhuhai (CN)

(73) Assignee: ZHUHAI PANTUM ELECTRONICS CO., LTD., Zhuhai (CN)

( * ) Notice: Subject to any disclaimer, the term of this patent is extended or adjusted under 35 U.S.C. 154(b) by 0 days.

(21) Appl. No.: 18/324,678

(22) Filed: May 26, 2023

(65) Prior Publication Data
US 2023/0388437 A1    Nov. 30, 2023

(30) Foreign Application Priority Data
May 27, 2022    (CN) .......................... 202210592696.6

(51) Int. Cl.
H04N 1/54    (2006.01)
H04N 1/52    (2006.01)
(52) U.S. Cl.
CPC .............. *H04N 1/54* (2013.01); *H04N 1/52* (2013.01)
(58) Field of Classification Search
CPC ..... H04N 1/52; H04N 1/54; H04N 1/60–6097
See application file for complete search history.

(56) References Cited

U.S. PATENT DOCUMENTS 7,027,646 B2 *    4/2006    Shiiyama .............. G06T 3/4015
382/250
8,687,884 B2 *    4/2014    Furuya ................. H04N 1/6027
382/167

* cited by examiner

Primary Examiner — Barbara D Reinier
(74) Attorney, Agent, or Firm — ANOVA LAW GROUP PLLC

(57) ABSTRACT

The present disclosure provides a color enhancement method, an image-forming apparatus and a storage medium. The method includes dividing color band data to-be-processed into a plurality of color blocks; counting a quantity of exposure points of each color channel of each color block in an apparatus color space, and generating an exposure point distribution image corresponding to each color block; converting the exposure point distribution image into a color image in a preset color space; calculating a color feature value corresponding to each color block according to the color image in the preset color space; and determining whether the color block needs image enhancement; and if the color block needs the image enhancement, modifying a weight of each color channel in the apparatus color space according to the color feature value, and outputting modified data of each color channel according to the modified weight of each color channel.

20 Claims, 8 Drawing Sheets

COLOR ENHANCEMENT METHOD, IMAGE-FORMING APPARATUS, AND STORAGE MEDIUM

CROSS-REFERENCE TO RELATED APPLICATION

The present disclosure claims the priority to Chinese patent application No. 202210592696.6, filed on May 27, 2022, in the China National Intellectual Property Administration, the entirety of which is incorporated herein by reference.

TECHNICAL FIELD

The present disclosure generally relates to the field of image-forming technology and, more particularly, relates to a color enhancement method, an image-forming apparatus, and a storage medium.

BACKGROUND

Image enhancement refers to purposeful emphasis on overall or local features of images in a given application, converting originally unclear images into clear images, or emphasizing the features of interest and suppressing the features that are not of interest, and expanding the difference between different object features in the images, which may improve image quality, enrich information and thus increase image usage value. Currently, image enhancement is widely used in medical diagnosis, image recognition, remote sensing images and other fields.

The image enhancement technologies in the existing technology all involve complex algorithm designs, which may have large amount of calculations, high parallel processing requirements, and high cost requirements for software and hardware. Therefore, it has not been widely applied in corresponding image-forming apparatuses. For example, when color scanning or copying is performed, obtained images may have edge deviation with reduced image quality.

Therefore, there is a need to provide a low-cost image enhancement processing technology for image-forming apparatuses.

SUMMARY

One aspect of the present disclosure provides a color enhancement method. The method includes dividing color band data to-be-processed into a plurality of color blocks; counting a quantity of exposure points of each color channel of each color block in an apparatus color space, and generating an exposure point distribution image corresponding to each color block according to the quantity of exposure points of each color channel; converting the exposure point distribution image into a color image in a preset color space; calculating a color feature value corresponding to each color block according to the color image in the preset color space; and according to position information and/or the color feature value of each color block, determining whether the color block needs image enhancement; and if the color block needs the image enhancement, modifying a weight of each color channel in the apparatus color space according to the color feature value, and outputting modified data of each color channel according to the modified weight of each color channel.

Another aspect of the present disclosure provides an image-forming apparatus. The apparatus includes a processor, and a memory configured to store a computer program, where when the computer program is executed, the processor is configured to perform a color enhancement method. The method includes dividing color band data to-be-processed into a plurality of color blocks; counting a quantity of exposure points of each color channel of each color block in an apparatus color space, and generating an exposure point distribution image corresponding to each color block according to the quantity of exposure points of each color channel; converting the exposure point distribution image into a color image in a preset color space; calculating a color feature value corresponding to each color block according to the color image in the preset color space; and according to position information and/or the color feature value of each color block, determining whether the color block needs image enhancement; and if the color block needs the image enhancement, modifying a weight of each color channel in the apparatus color space according to the color feature value, and outputting modified data of each color channel according to the modified weight of each color channel.

Another aspect of the present disclosure provides a non-transitory computer-readable storage medium, where the storage medium includes a stored program; and when being executed, the program causes a processor to implement a color enhancement method. The method includes dividing color band data to-be-processed into a plurality of color blocks; counting a quantity of exposure points of each color channel of each color block in an apparatus color space, and generating an exposure point distribution image corresponding to each color block according to the quantity of exposure points of each color channel; converting the exposure point distribution image into a color image in a preset color space; calculating a color feature value corresponding to each color block according to the color image in the preset color space; and according to position information and/or the color feature value of each color block, determining whether the color block needs image enhancement; and if the color block needs the image enhancement, modifying a weight of each color channel in the apparatus color space according to the color feature value, and outputting modified data of each color channel according to the modified weight of each color channel.

Other aspects of the present disclosure may be understood by those skilled in the art in light of the description, the claims, and the drawings of the present disclosure.

BRIEF DESCRIPTION OF THE DRAWINGS

To clearly describe technical solutions of various embodiments of the present disclosure, the drawings, which need to be used for describing various embodiments, are described below. Obviously, the drawings in following description are merely some embodiments of the present disclosure. For those skilled in the art, other drawings may be obtained in accordance with these drawings without creative efforts.

DETAILED DESCRIPTION

To better understand technical solutions of the present disclosure, embodiments of the present disclosure are described in detail with reference to accompanying drawings.

It should be noted that described embodiments are only a part of embodiments of the present disclosure, rather than all embodiments. Based on embodiments of the present disclosure, all other embodiments obtained by those skilled in the art without creative work shall fall within the protection scope of the present disclosure.

Terms used in embodiments of the present disclosure are only for the purpose of describing specific embodiments and are not intended to limit the present disclosure. Singular forms "a", "said" and "the" used in embodiments of the present disclosure and the appended claims are also intended to include plural forms unless the context clearly indicates otherwise.

It should be understood that the term "and/or" used herein is only an association relationship describing associated objects, indicating that there may be three relationships. For example, A and/or B may indicate that A exists alone, A and B exist simultaneously, and B exists alone. In addition, the character "/" in the present disclosure may indicate that contextual objects are in an "or" relationship.

It should be understood that although terms such as "first", "second", and "third" may be configured to describe terminals in embodiments of the present disclosure, these terminals should not be limited to above-mentioned terms. Above-mentioned terms may only be configured to distinguish one terminal from another. For example, without departing from the scope of embodiments of the present disclosure, the first terminal may also be called the second terminal; and similarly, the second terminal may also be called the first terminal.

Depending on the context, the word "if" as used herein may be interpreted as "at" or "when" or "in response to determining" or "in response to detect". Similarly, depending on context, the phrase "if determined" or "if detected (the stated condition or event)" may be interpreted as "when determined" or "in response to determining" or "when detected (the stated condition or event)" or "in response to detection of (the stated condition or event)".

Figure 1A:
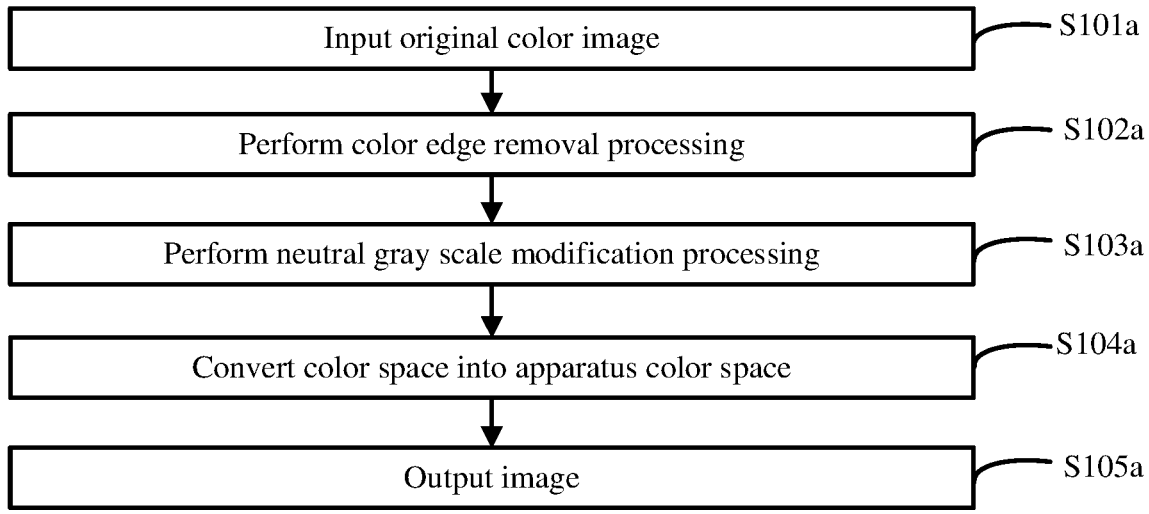
FIG. 1A illustrates a flow chart of an image processing method.

Referring to FIG. 1A, FIG. 1A illustrates a flow chart of an image processing method.

The image processing method in the example of FIG. 1A may be applied to an image-forming apparatus. The image-forming apparatus may be a device having at least one function related to image formation, which may include, but may not be limited to, a printing function, a scanning function, a copying function, and a facsimile function. For example, single function printer may be an image-forming apparatus with printing function only; and multi-function printer may be an image-forming apparatus with printing, copying, scanning and/or faxing functions, and the quantity of paper trays may also be selectively configured. For another example, digital composite machine, based on the copying function, may have standard or optional printing, scanning, and faxing functions, output files in the form of laser printing using digital principles, edit images and text as needed, and may have a large-capacity paper tray, high memory, large hard disk, powerful network support and multi-task parallel processing capabilities.

The image-forming apparatus may process the images with a Pipeline data processing model and convert original color images into data for the image processing engine of the image-forming apparatus to perform operations.

The image processing method in FIG. 1A may include following exemplary steps.

At S101a, an original color image may be inputted.

For example, the original color image may contain multi-bit data in various common color spaces, for example, color data of 8-bit color depth in the common RGB color space.

At S102a, color edge removal processing may be performed.

At S103a, neutral gray scale modification processing may be performed.

For example, in image-forming operations, the color of the text region may be neutral gray.

At S104a, a color space may be converted into an apparatus color space.

For example, the color space of the original color image may be converted into the color space of the apparatus, so that the image processing engine of the apparatus may perform image-forming operations. The apparatus color space of the image-forming apparatus may have four color channels of C (cyan), M (magenta), Y (yellow), and K (black).

At S105a, image data may be outputted.

For example, the color data of four color channels may be outputted to the image processing engine of the image-forming apparatus for operations.

Due to the limitation of software and hardware of the image-forming apparatus, using above image processing method may improve processing efficiency. However, performing color edge removal processing and neutral gray scale modification processing may reduce the color information in certain positions, such as a logo part around text region. Above method also may not emphasize features of the text region, so that above method may need to be improved.

Figure 1B:
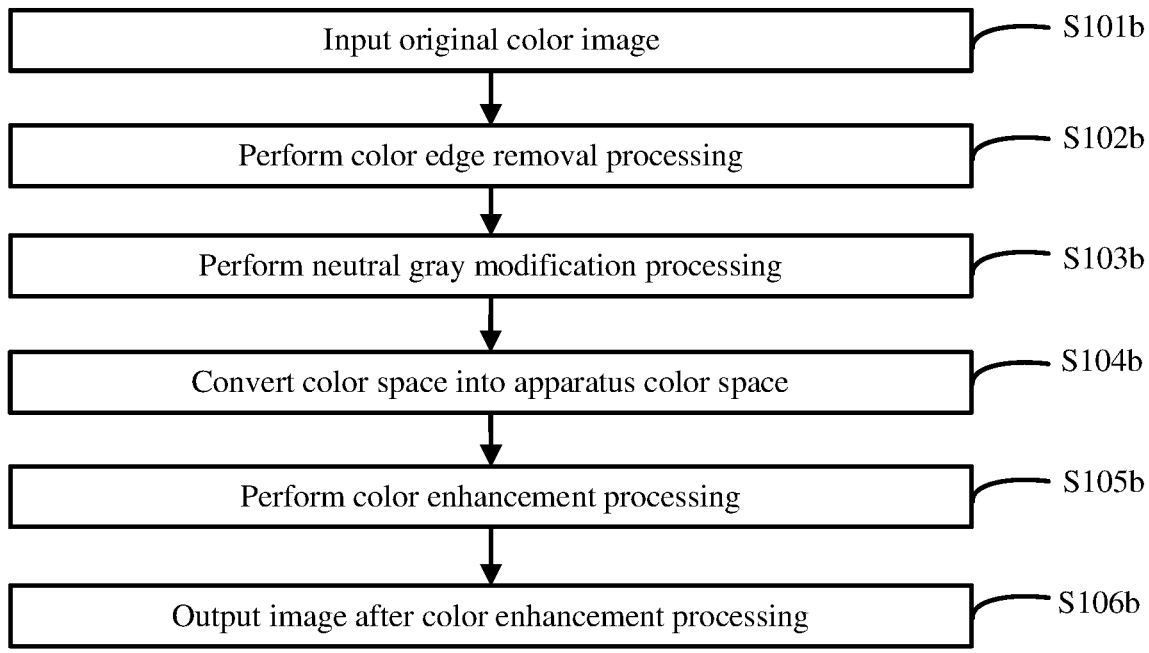
FIG. 1B illustrates a flow chart of an image processing method according to exemplary embodiments of the present disclosure.

The color enhancement method of embodiments of the present disclosure may be applied in the process shown in FIG. 1B, and optionally, applied in the image-forming apparatus with limited software and hardware. Color enhancement processing may be added at the end of the Pipeline processing model, which may enhance color features of specific locations and points of interest and improve outputted image quality, while may not increase algorithm complexity and have low software and hardware requirements.

The image processing method in FIG. 1B may include following exemplary steps.

At S101b, an original color image may be inputted.

At S102b, color edge removal processing may be performed.

At S103b, neutral gray modification processing may be performed.

At S104b, a color space may be converted into an apparatus color space.

At S105b, color enhancement processing may be performed.

At S106b, the image after color enhancement processing may be outputted.

Embodiments of the present disclosure provide a color enhancement processing method, which may be applied in the process of the image processing method in FIG. 1B to improve outputted image quality and have simple and efficient processing process.

Figure 2A:
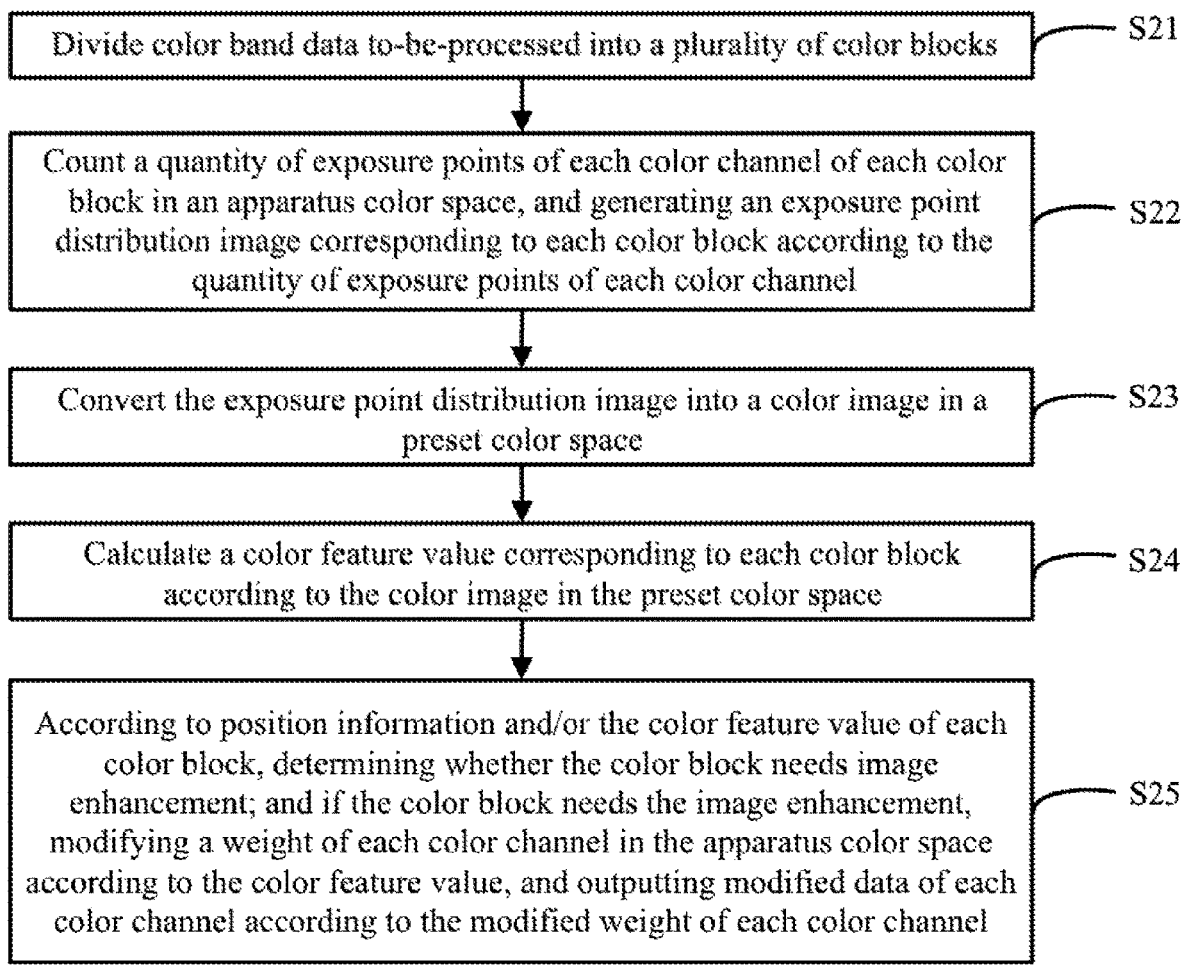
FIG. 2A illustrates a flow chart of a color enhancement method according to exemplary embodiments of the present disclosure.

Referring to FIG. 2A, FIG. 2A illustrates a flow chart of a color enhancement method according to exemplary embodiments of the present disclosure.

The color enhancement method in embodiments of the present disclosure may include following exemplary steps.

At S21, color band data to-be-processed may be divided into a plurality of color blocks.

At S22, the quantity of exposure points of each color channel of each color block in the apparatus color space may be counted, and an exposure point distribution image corresponding to the color block may be generated according to the quantity of exposure points of each color channel.

At S23, the exposure point distribution image may be converted into a color image in a preset color space.

At S24, a color feature value corresponding to the color block may be calculated according to the color image in the preset color space.

At S25, according to position information and/or the color feature value of the color block, whether the color block needs image enhancement may be determined; and if the color block needs image enhancement, the weight of each color channel in the apparatus color space may be modified according to the color feature value, and modified data of each color channel may be outputted according to the weight of each modified color channel.

For the color enhancement method provided by embodiments of the present disclosure, the color band data to-be-processed may be divided into the plurality of color blocks; the quantity of exposure points of each color channel of each color block may be counted, and corresponding exposure point distribution image may be generated; the exposure point distribution image may be converted into the color image in the preset color space; the color feature value corresponding to the color block may be calculated according to the color image in the preset color space; according to the position information and/or color feature value of the color block, whether image enhancement needs to be performed may be determined; and when it determines that image enhancement needs to be performed, the color of the image at a specific preset position may be enhanced, or the image corresponding to specific content may be enhanced. Therefore, a simple and efficient image enhancement method is provided, which may be applied to the image-forming apparatus, reduce algorithm complexity, and improve the image quality outputted by the image-forming apparatus.

In some embodiments of the present disclosure, the color enhancement method provided by the present disclosure is described hereinafter.

Figure 2B:
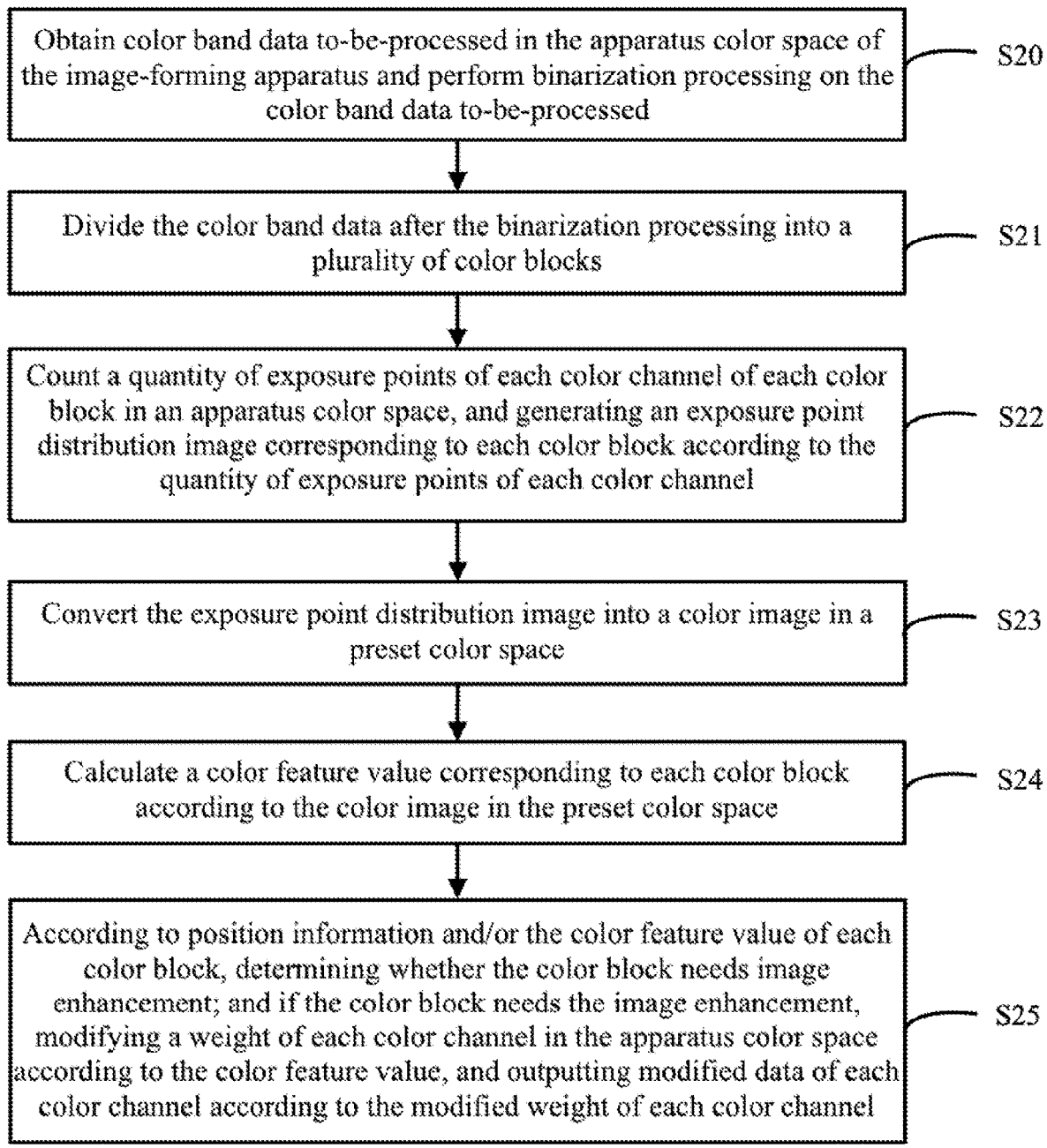
FIG. 2B illustrates another flow chart of a color enhancement method according to exemplary embodiments of the present disclosure.

Referring to FIG. 2B, FIG. 2B illustrates another flow chart of a color enhancement method according to exemplary embodiments of the present disclosure.

The color enhancement method in one embodiment, before S21-S25, may further include following exemplary steps.

At S20, the color band data in the apparatus color space of the image-forming apparatus may be obtained, and binarization processing may be performed on the color band data.

For example, the image-forming apparatus may be a device such as a printer or a scanner; and the apparatus color space of the image-forming apparatus may include the plurality of color channels. For example, the apparatus color space of the image-forming apparatus (e.g., a printer) may include C, M, Y and K color channels.

The image-forming apparatus may process the image data with the Pipeline processing model. At the processing end of the model, the color band data of the image-forming apparatus may be obtained and binarized. The binarization algorithm may include, but may not be limited to, the Halftone algorithm. For the technical solutions of the present disclosure, the color detection and enhancement processing may be performed after the Halftone binarization processing, which may reduce the memory needed for detection; meanwhile, since the detection and enhancement processing is at the end of the image processing pipeline, the color detection and enhancement processing may be implemented in a same software and hardware module, which may reduce time requirement for system control and reduce implementation complexity of technical solutions.

At S21, the color band data after the binarization processing may be divided into the plurality of color blocks.

For example, in the solutions of the present disclosure, the color band data after binarization processing may be equally divided into the plurality of identical color blocks according to height information. Each color block must carry its own position information, so that the color band data may be evenly divided into the plurality of equal color blocks, and the region which needs color enhancement processing may be further accurately located.

At S22, the quantity of exposure points of each color channel of each color block in the apparatus color space may be counted, and the exposure point distribution image corresponding to the color block may be generated according to the quantity of exposure points of each color channel.

For example, in the present disclosure, the Halftone algorithm may be configured to binarize the color data of the C, M, Y and K color channels in the color band data, and then obtain the binarized data corresponding to each color channel. The data after the binarization processing may contain 1-bit color depth information, that is, 0 and 1.

In one embodiment, according to the binarized data of each color block in C, M, Y and K color channels, corresponding quantity of exposure points may be determined according to the quantity of pixel points with non-zero pixel values.

Figure 2C:
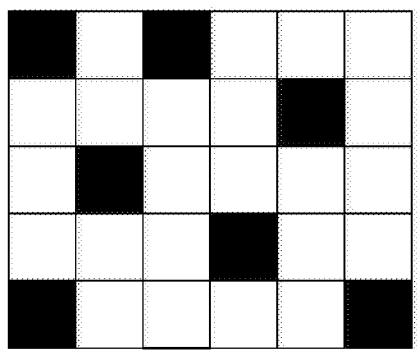
FIG. 2C illustrates a schematic of generating an exposure point distribution image according to exemplary embodiments of the present disclosure.
Figure 2C:
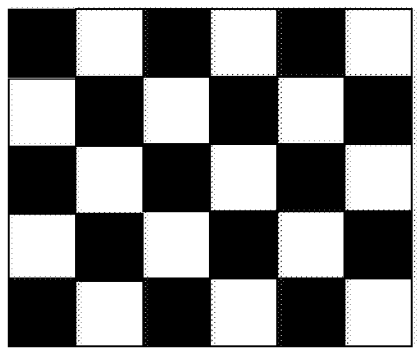

In one embodiment, the distribution of exposure points may be statistically converted, so that the binarized data may be converted into 8-bit pixel data (0~255) capable of being processed according to statistical distribution features. As shown in FIG. 2C as an example, it is assumed that the binarized data in a certain color channel has 15 black points, so that the gray value of such region after conversion is 15, and corresponding 8 bit pixel data is converted to 00001111. Previous halftone binarized image has only two pixel values of 0 and 1, that is, only white and black, which cannot represent color image. Therefore, through the conversion to corresponding exposure point distribution image, it may determine which colors are covered by corresponding exposure points, that is, the color distribution corresponding to such exposure points may be determined through the exposure point distribution image.

At S23, the exposure point distribution image may be converted into the color image in the preset color space.

For example, in one embodiment, the exposure point distribution image may be converted into a color image in the YCC color space.

In one embodiment, the YCC space image only has two color channels of Cb and Cr, that is, blue and red. Therefore, the exposure point distribution image may be converted into the YCC space image, and CMYK 4 color channels may be converted into 2 color channels, which may determine whether enhancement processing is needed with fewer variables and may be also convenient for weight calculation and conversion during subsequent enhancement processing. Obviously, the calculation using 2 color channels may be easier than the calculation using 4 color channels. For example, YCC may only need to calculate two variables of Cr and Cb, while CMYK may need to calculate the conversion between four variables of C, M, Y and K.

At S24, the color feature value corresponding to the color block may be calculated according to the color image in the preset color space.

At S25, according to the position information and/or the color feature value of the color block, whether the color block needs image enhancement may be determined; and if the color block needs image enhancement, the weight of each color channel in the apparatus color space according to the color feature value may be modified, and modified data of each color channel may be outputted according to the weight of each modified color channel.

For above-mentioned color enhancement method provided by embodiments of the present disclosure, the color band data in the apparatus color space of the image-forming apparatus may be obtained, and binarization processing may be performed to simplify the amount of data that needs to be processed; the color band data after the binarization processing may be divided into the plurality of color blocks; the quantity of exposure points of each color channel of each color block may be counted, and corresponding exposure point distribution image may be generated; the exposure point distribution image may be converted into the color image in the preset color space; the color feature value corresponding to the color block may be calculated according to the color image in the preset color space; according to the position information and/or color feature value of the color block, whether image enhancement needs to be performed may be determined; and when it determines that image enhancement needs to be performed, the color of the image at a specific preset position may be enhanced, or the image corresponding to specific content may be enhanced. Therefore, a simple and efficient image enhancement method is provided, which may be applied to the image-forming apparatus, reduce algorithm complexity, and improve the image quality outputted by the image-forming apparatus.

Figure 3:
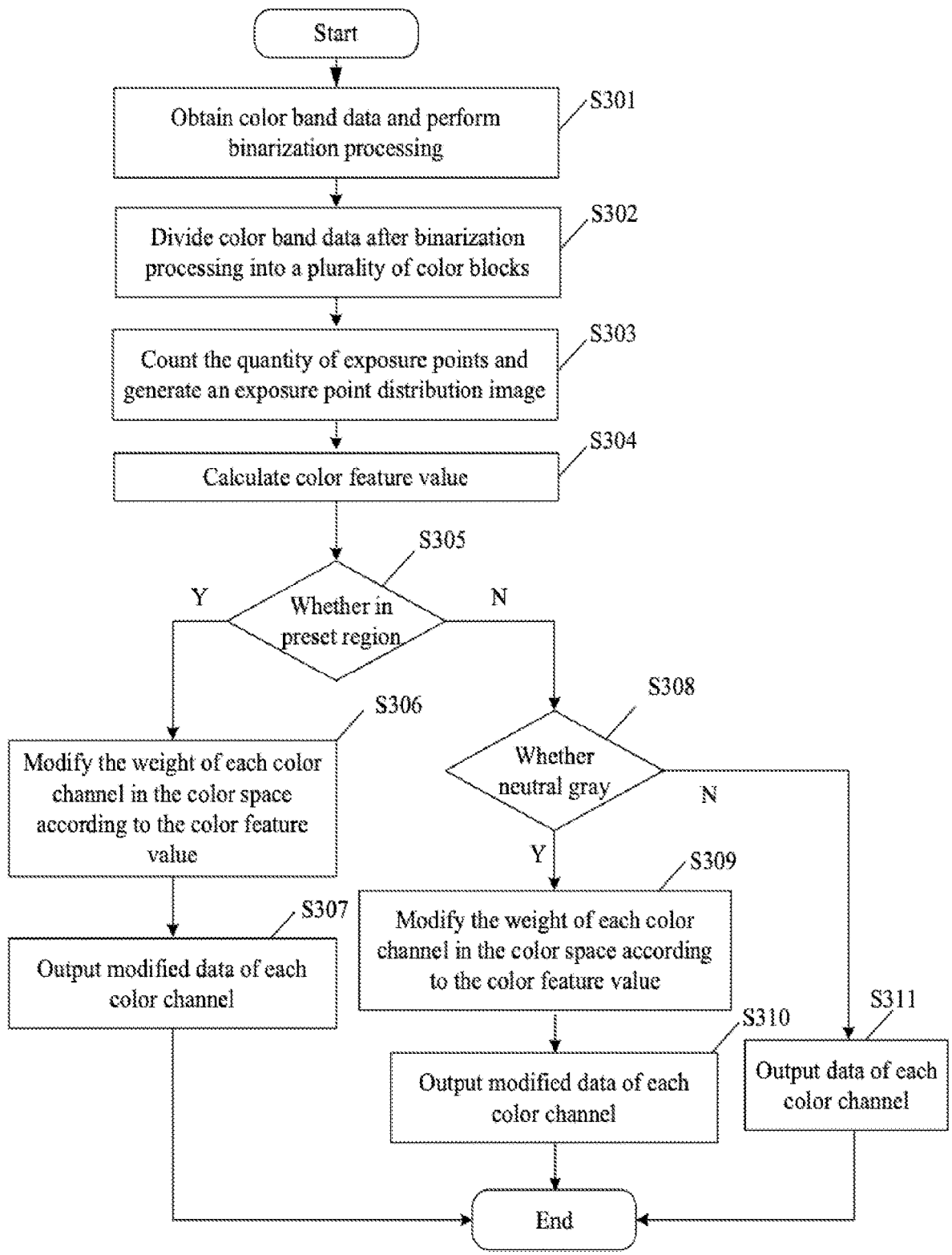
FIG. 3 illustrates another flow chart of a color enhancement method according to exemplary embodiments of the present disclosure.

Referring to FIG. 3, in one embodiment, FIG. 3 illustrates another flow chart of a color enhancement method. The color enhancement method may include following exemplary steps.

At S301, the color band data in the apparatus color space of the image-forming apparatus may be obtained, and binarization processing may be performed on the color band data.

For example, in the image-forming operations, the image-forming apparatus may not process entire page but divide the page data into data blocks one by one for data processing, and each data segment is the color band data.

In embodiments of the present disclosure, the apparatus color space of the image-forming apparatus may include C, M, Y and K color channels, the color band data may correspondingly contain data of each color channel, and each color channel may be data with a multi-bit color depth.

In one embodiment, the Halftone algorithm may be configured to perform binarization processing on the color data of the C, M, Y and K color channels in the color band data respectively to obtain the binarized data corresponding to each color channel. Binarized data may contain 1-bit color depth information, that is, 0 and 1.

At S302, the color band data after the binarization processing may be divided into the plurality of color blocks.

For example, in one embodiment, the color band data after the binarization processing may be divided into the plurality of color blocks of equal size according to the height of the color band data, that is, the height of the color band may be a positive integer multiple of the quantity of color blocks. Dividing the color band into the plurality of color blocks may be further beneficial for more precise position processing.

At S303, the quantity of exposure points of each color block in each color channel in the apparatus color space may be counted, and according to the quantity of exposure points of each color channel, the exposure point distribution image corresponding to the color block may be generated.

For example, according to the binarized data of each color block in C, M, Y and K color channels, corresponding quantity of exposure points may be determined according to the quantity of pixel points in which the pixel values are non-zero.

Herein, C (cyan) channel may be taken as an example. According to the binarized data, if the pixel value of a pixel is 1, the quantity of exposure points may need to be accumulated.

Next, according to the quantity of exposure points in each color channel, the exposure point distribution image corresponding to the color block may be generated, that is, the exposure point distribution image may include the quantity of exposure points of each pixel in the color block in each color channel.

At S304, the color feature value corresponding to the color block may be calculated.

In one embodiment, the exposure point distribution image may be converted into the color image in the preset color space.

For example, the exposure point distribution image may be converted into the color image in the YCC color space.

The YCC color space image includes two color parameters of Cr (blue) and Cb (red). The exposure point distribution image may be into the YCC color space image. It may be understood that the YCC space image may only have two color channels of Cb and Cr, that is, blue and red. Four color channels of C, M, Y and K may be converted into two color channels of Cr and Cb. Therefore, the quantity of variable parameters may be reduced, the complexity of calculation and conversion between parameters may be reduced, and it is also convenient for weight modification calculation of each color channel during subsequent color enhancement.

The color feature value corresponding to the color block may be calculated.

For example, in embodiments of the present disclosure, corresponding color feature value may be calculated based on pixel coordinates and pixel value of each pixel point in the color block, that is, the color feature value may include the color information and coordinate information of the pixel point.

At S305, a first determination may be performed, and whether the color block is in a preset region may be determined.

For example, whether the color block is in the preset region may be determined according to the coordinates of the pixel points in the color block. The preset region in one embodiment of the present disclosure may be, but may not be limited to, the arrangement position region of Logo and the like.

If the determination result is Yes, execute S306-S307; if the determination result is No, execute S308.

In an optional implementation manner, image data, such as color information, position information and the like in the preset region of entire image, may be obtained and saved by scanning the image. In another implementable manner, page templates of various types and sizes may be stored in the image-forming apparatus; and through panel configuration, plane coordinate axes or spatial coordinate axes may be configured to represent any region based on the template.

It may be understood that the color block image data may be obtained, and whether a part belongs to the preset region may be determined based on the image data; or the color block image data may be obtained, corresponding color feature value may be calculated based on the image data, whether the part belongs to the preset region may be determined (that is, whether the part needs to perform image enhancement processing may be determined). If the image data belonging to the preset region is in the color block, execute S306-S307, otherwise execute S308.

At S306, the weight of each color channel in the color space may be modified according to the color feature value.

For example, calculated color feature value may be compared with the preset first target color feature value, whether image enhancement processing is needed may be determined by the difference between calculated color feature value and the first target color feature value, and in the case of that image enhancement processing is needed, the weight of each color channel may be modified. The first target color feature value may be related to the color of the preset Logo pattern. The modified weight of each color channel may be used as the data modification factor of each color channel.

At S307, modified data of each color channel may be outputted according to the modified weight of each color channel.

For example, the data of each color channel may be re-modified according to the modified weight of each color channel, which may strengthen the color information of the preset position such as the Logo and the like and improve the image quality.

At S308, a second determination may be performed, and whether the color feature value satisfies a preset condition may be determined according to calculated color feature value.

For example, according to whether the color feature value satisfies the preset condition, it may determine whether the color block is the region of interest, such as a text region.

The color feature value may be compared with the preset second target color feature value, so that whether the color block is in the region of interest may be obtained. Taking the text region as an example, the second target color feature value may be the feature value corresponding to neutral gray; when calculated color feature value is within the neutral gray range, it may determine that the color block is in the text region of interest, and the color enhancement of the text region may be needed. If the determination result is No, no enhancement may be needed. That is, if the second determination result is Yes, execute S309 and S310; and if the second determination result is No, execute S311.

At S309, the weight of each color channel in the color space may be modified according to the color feature value.

For example, calculated color feature value may be compared with the preset second target color feature value, and the weight of each color channel may be modified based on the difference between calculated color feature value and the second target color feature value. The second target color feature value may be related to the preset color feature value of the text region. The modified weight of each color channel may be used as the data modification factor of each color channel.

At S310, modified data of each color channel may be outputted according to the modified weight of each color channel.

For example, the data of each color channel may be re-modified according to the modified weight of each color channel, which may strengthen the color information of the text region and improve the image quality.

At S311, data of each color channel may be outputted.

For example, when the first judgment result and the second judgment result are both No, the color data of the C, M, Y and K color channels in the apparatus color space may be directly outputted without color enhancement and directly processed by the image processing engine.

For above-mentioned color enhancement method provided by embodiments of the present disclosure, the image to-be-processed may be divided into color blocks; the quantity of exposure points of each color channel of each color block may be counted, and corresponding exposure point distribution image may be generated; the exposure point distribution image may be converted into the color image in the preset color space; the color feature value corresponding to the color block may be calculated according to the color image in the preset color space; according to the position information and/or color feature value of the color block, whether image enhancement needs to be performed may be determined; and when it determines that image enhancement needs to be performed, the color of the image at a specific preset position may be enhanced, or the image corresponding to specific content may be enhanced. Furthermore, on the one hand, it only needs to enhance the region that needs to be enhanced, which may reduce system resources needed for image enhancement; on the other hand, it avoids over-enhancing the region that does not need to be enhanced which may reduce the image quality. Meanwhile, the color enhancement method provided by embodiments of the present disclosure may perform image enhancement processing on the region that needs to be enhanced, thereby improving the image quality.

Another aspect of the embodiments of the present disclosure further provides a color enhancement apparatus.

Figure 4A:
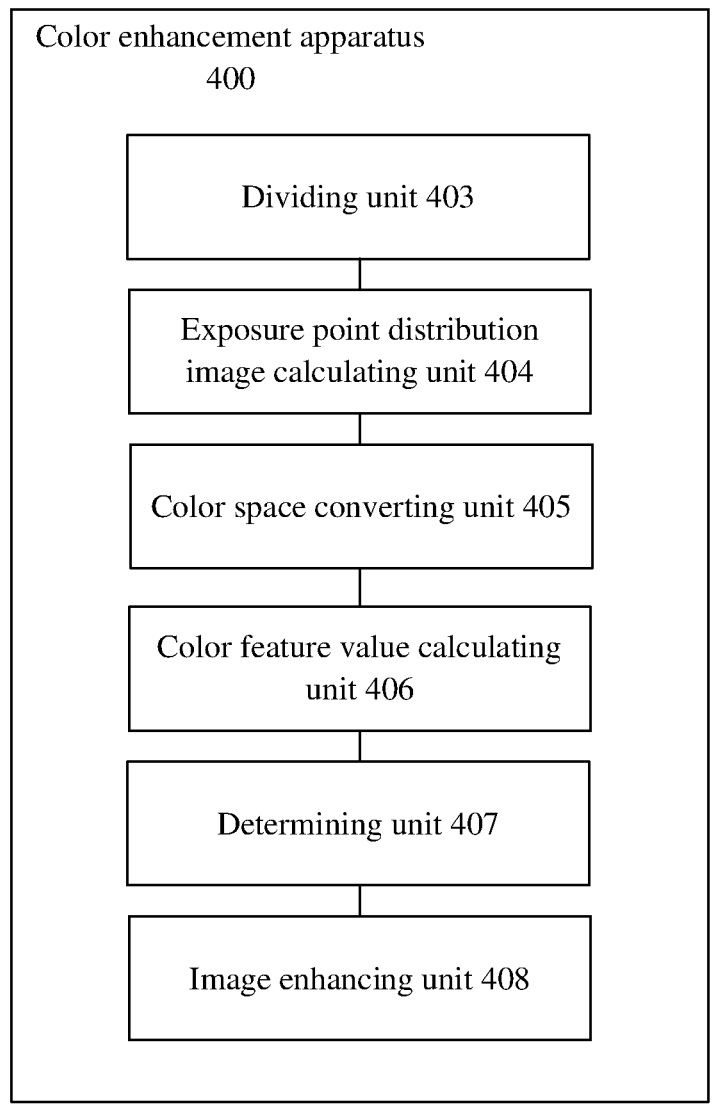
FIG. 4A illustrates a functional block diagram of a color enhancement apparatus according to exemplary embodiments of the present disclosure.

As shown in FIG. 4A, a color enhancement apparatus 400 may include a dividing unit 403, configured to divide the color band data into the plurality of color blocks; an exposure point distribution image calculating unit 404, configured to count the quantity of exposure points of each color channel of each color block in the apparatus color space and generate the exposure point distribution image corresponding to the color block according to the quantity of exposure points of each color channel; a color space converting unit 405, configured to convert the exposure point distribution image into the color image in the preset color space; a color feature value calculating unit 406, configured to calculate the color feature value corresponding to the color block according to the color image in the preset color space; a determining unit 407, configured to determine whether image enhancement is needed for the color block according to the position information and/or the color feature value of the color block; and an image enhancing unit 408, configured to modify the weight of each color channel in the apparatus color space according to the color feature value when it determines that the color block needs image enhancement and output the modified data of each color channel according to the modified weight of each color channel.

Another embodiment of the present disclosure further provides a color enhancement apparatus.

Figure 4B:
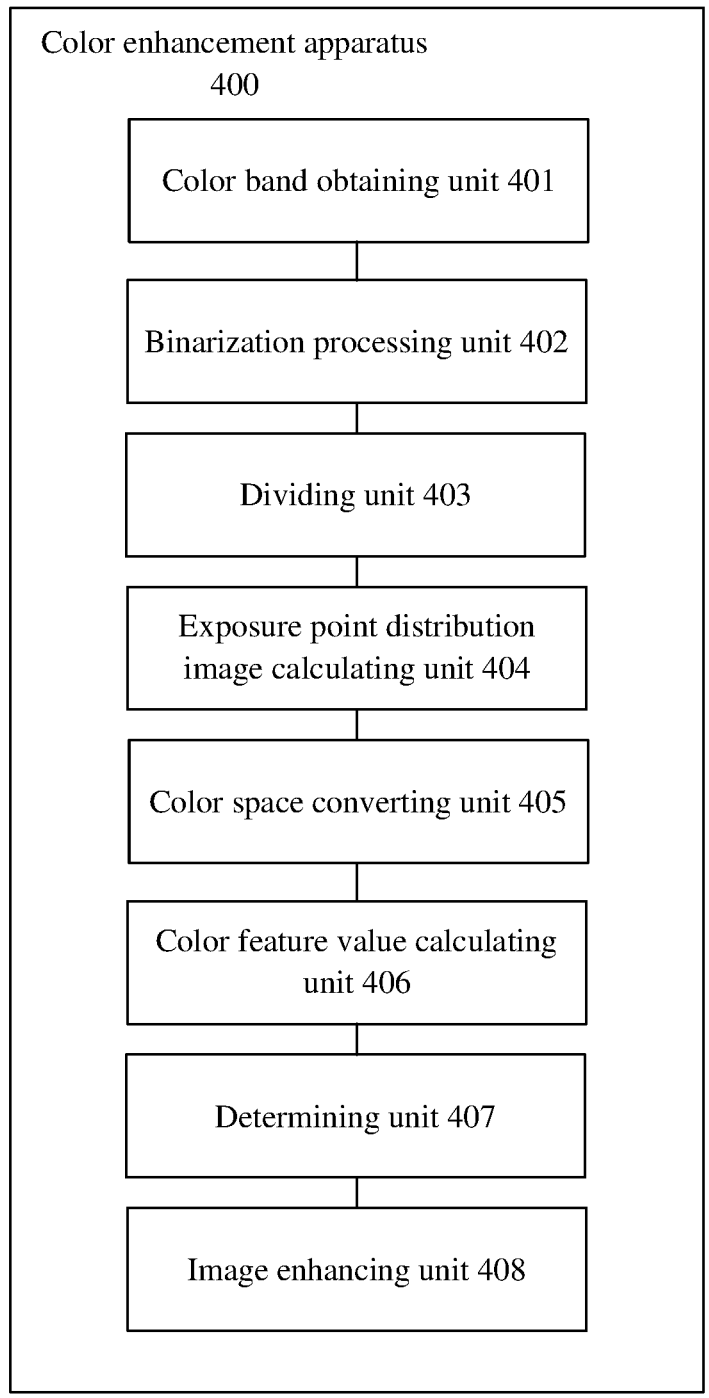
FIG. 4B illustrates another functional block diagram of a color enhancement apparatus according to exemplary embodiments of the present disclosure.

FIG. 4B schematically illustrates the color enhancement apparatus.

In one embodiment, the color enhancement apparatus may include a color band obtaining unit 401, configured to obtain color band data in the apparatus color space of the image-forming apparatus; a binarization processing unit 402, configured to perform binarization processing on the color band data; the dividing unit 403, configured to divide the color band data after the binarization processing into the plurality of color blocks; the exposure point distribution image calculating unit 404, configured to count the quantity of exposure points of each color channel of each color block in the apparatus color space and generate the exposure point distribution image corresponding to the color block according to the quantity of exposure points of each color channel; the color space converting unit 405, configured to convert the exposure point distribution image into the color image in the preset color space; the color feature value calculating unit 406, configured to calculate the color feature value corresponding to the color block according to the color image in the preset color space; the determining unit 407, configured to determine whether image enhancement is needed for the color block according to the position information and/or the color feature value of the color block; and the image enhancing unit 408, configured to modify the weight of each color channel in the apparatus color space according to the color feature value when the determination result is Yes, and output the modified data of each color channel according to the modified weight of each color channel.

For above-mentioned color enhancement method provided by embodiments of the present disclosure, the color band data in the apparatus color space of the image-forming apparatus may be obtained, and binarization processing may be performed to simplify the amount of data that needs to be processed; the color band data after the binarization processing may be divided into the plurality of color blocks; the quantity of exposure points of each color channel of each color block may be counted, and corresponding exposure point distribution image may be generated; the exposure point distribution image may be converted into the color image in the preset color space; the color feature value corresponding to the color block may be calculated according to the color image in the preset color space; according to the position information and/or color feature value of the color block, whether image enhancement needs to be performed may be determined; and when it determines that image enhancement needs to be performed, the color of the image at a specific preset position may be enhanced, or the image corresponding to specific content may be enhanced. Therefore, a simple and efficient image enhancement method is provided, which may be applied to the image-forming apparatus, reduce algorithm complexity, and improve the image quality outputted by the image-forming apparatus.

The color enhancement apparatus in embodiments of the present disclosure may be implemented in the image-forming apparatus in the form of hardware or software and enable the image-forming apparatus to implement the color enhancement method in above-mentioned embodiments. The process of such method may not be described in detail herein.

Another aspect of embodiments of the present disclosure further provides an image-forming apparatus, including a color enhancement apparatus as described above.

Another aspect of embodiments of the present disclosure further provides a corresponding storage medium which may store a computer program. When a computer device executes the computer program, above-mentioned color enhancement method may be implemented.

Figure 5:
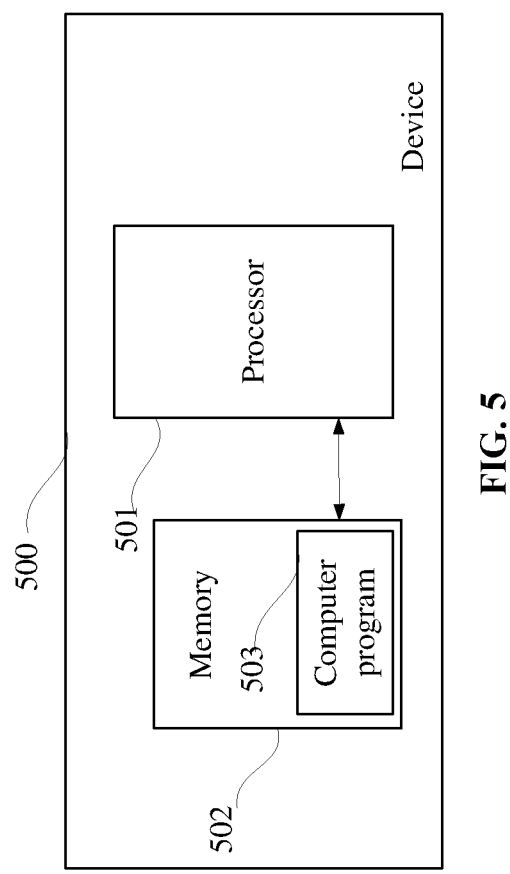
FIG. 5 illustrates a structural schematic of a device according to exemplary embodiments of the present disclosure.

FIG. 5 illustrates a structural schematic of a device according to exemplary embodiments of the present disclosure. As shown in FIG. 5, a computer device 500 in one embodiment may include a processor 501, a memory 502, and a computer program 503 which may be stored in the memory and executed on the processor 501. The color enhancement method in embodiments of the present disclosure may be implemented when the processor 501 executes the computer program 503, which may not be described in detail to avoid repetition. Or when the computer program is executed by the processor 501, the function of each model/unit in the color enhancement apparatus in embodiments of the present disclosure may be implemented, which may not be described in detail to avoid repetition.

The computer device 500 may be a computing device such as a single computer device, a cloud computer device, or the like. The computer device may include, but not limited to, the processor 501 and the memory 502. Those skilled in the art can understand that FIG. 5 is only an example of the computer device 500, which may not limit the computer device 500. The computer device may include more or fewer parts than those shown in drawings, combine certain parts or use different parts. For example, the computer device may also include input and output devices, network access devices, buses, and the like.

The processor 501 may be a central processing unit (CPU) and may also be a general-purpose processor, a digital signal processor (DSP), an application specific integrated circuit (ASIC), a field-programmable gate array (FPGA), other programmable logic device, a discrete gate or transistor logic device, a discrete hardware part, and/or the like. A general-purpose processor may be a microprocessor, or the processor may be any conventional processor or the like.

The memory 502 may be an internal storage unit of the computer device 500, such as a hard disk or a memory of the computer device 500. The memory 502 may also be an external storage device of the computer device 500, such as a plug-in hard disk equipped on the computer device 500, a smart media card (SMC), a secure digital (SD) card, a Flash card, or the like. Furthermore, the memory 502 may also include both an internal storage unit of the computer device 500 and an external storage device. The memory 502 may be configured to store computer programs and other programs and data required by the computer device. The memory 502 may also be configured to temporarily store data that has been outputted or will be outputted.

From above-mentioned embodiments, it may be seen that the solutions provided in the present disclosure may achieve at least following beneficial effects.

For the color enhancement method provided by embodiments of the present disclosure, the color band data to-be-processed may be divided into the plurality of color blocks; the quantity of exposure points of each color channel of each color block may be counted, and corresponding exposure point distribution image may be generated; the exposure point distribution image may be converted into the color image in the preset color space; the color feature value corresponding to the color block may be calculated according to the color image in the preset color space; according to the position information and/or color feature value of the color block, whether image enhancement needs to be performed may be determined; and when it determines that image enhancement needs to be performed, the color of the image at a specific preset position may be enhanced, or the image corresponding to specific content may be enhanced. Therefore, a simple and efficient image enhancement method is provided, which may be applied to the image-forming apparatus, reduce algorithm complexity, and improve the image quality outputted by the image-forming apparatus.

Those skilled in the art can clearly understand that for the convenience and brevity of description, the working process of above-described system, apparatus and unit can refer to corresponding process in above-mentioned method embodiments, which may not be described in detail herein.

In some embodiments provided in the present disclosure, it should be understood that the disclosed system, apparatus and method may be implemented in other manners. For example, apparatus embodiments described above may be only exemplary. For example, the division of the unit may be only a logical function division, and there may be another division manner during actual implementation. For example, multiple units or parts may be combined or integrated into another system, or some features may be omitted or not implemented. In addition, mutual coupling or direct coupling or communication connection shown or discussed above may be indirect coupling or communication connection through some interfaces, apparatus or units; and may be electrical, mechanical or other manners.

Above-mentioned integrated units implemented in the form of software functional units may be stored in a computer-readable storage medium. Above-mentioned software functional units may be stored in a storage medium, which may include a plurality of instructions to make a computer device (which may be a personal computer, a server, a network device or the like) or a processor execute some steps of above-mentioned methods in various embodiments of the present disclosure. Above-mentioned storage media may include U disk, mobile hard disk, read-only memory (ROM), random access memory (RAM), magnetic disk or optical disk and other media that can store program codes.

Above-mentioned embodiments of the present disclosure may be exemplary and may not be intended to limit the present disclosure. Any modifications, equivalent replacements, improvements and the like made within the spirit and principles of the present disclosure shall be included within the protection scope of the present disclosure.

What is claimed is:

1. A color enhancement method, applied to an image-forming apparatus, comprising:
    dividing color band data to-be-processed into a plurality of color blocks;
    counting a quantity of exposure points of each color channel of each color block in an apparatus color space, and generating an exposure point distribution image corresponding to each color block according to the quantity of exposure points of each color channel;
    converting the exposure point distribution image into a color image in a preset color space;
    calculating a color feature value corresponding to each color block according to the color image in the preset color space; and
    according to position information and/or the color feature value of each color block, determining whether the color block needs image enhancement; and if the color block needs the image enhancement, modifying a weight of each color channel in the apparatus color space according to the color feature value to provide modified data of each color channel, and outputting the modified data of each color channel onto a medium by the image forming apparatus.

2. The color enhancement method according to claim 1, before dividing the color band data to-be-processed into the plurality of color blocks, further including:
    obtaining the color band data to-be-processed in the apparatus color space of the image-forming apparatus and performing binarization processing on the color band data to-be-processed.

3. The color enhancement method according to claim 2, wherein:
    the apparatus color space of the image-forming apparatus includes C, M, Y and K color channels; and performing the binarization processing on the color band data to-be-processed includes performing the binarization processing on color data of the C, M, Y and K color channels in the color band data to-be-processed using a Halftone algorithm to obtain binarized data corresponding to each color channel.

4. The color enhancement method according to claim 1, wherein counting the quantity of the exposure points of each color channel of each color block in the apparatus color space includes:
    according to the binarized data of each color block in the C, M, Y and K color channels respectively, determining corresponding quantity of exposure points based on a quantity of pixel points with a non-zero pixel value.

5. The color enhancement method according to claim 1, wherein converting the exposure point distribution image into the color image in the preset color space includes:
    converting the exposure point distribution image into a color image in a YCC color space.

6. The color enhancement method according to claim 1, wherein calculating the color feature value corresponding to each color block includes:
    calculating the color feature value corresponding to each color block based on a pixel coordinate and/or a pixel value of each pixel point in each color block.

7. The color enhancement method according to claim 1, further including:
    according to the position information of each color block, performing a first determination to determine whether the color block is in a preset region; and if the color block is determined to be in the preset region, modifying the weight of each color channel in the apparatus color space according to the color feature value, and outputting the modified data of each color channel according to the weight of each modified color channel.

8. The color enhancement method according to claim 1, further including:
    according to the position information of each color block, performing a first determination to determine whether the color block is in a preset region; if the color block is determined to be not in the preset region, performing a second determination according to the color feature value to determine whether the color feature value satisfies a preset condition; and if the color feature value is determined to satisfy the preset condition, modifying the weight of each color channel in the apparatus color space according to the color feature value, and outputting the modified data of each color channel according to the modified weight of each color channel.

9. An image-forming apparatus, comprising:
a processor; and
a memory containing a computer program that, when being executed, causes the processor to perform:
  dividing color band data to-be-processed into a plurality of color blocks;
  counting a quantity of exposure points of each color channel of each color block in an apparatus color space, and generating an exposure point distribution image corresponding to each color block according to the quantity of exposure points of each color channel;
  converting the exposure point distribution image into a color image in a preset color space;
  calculating a color feature value corresponding to each color block according to the color image in the preset color space; and
  according to position information and/or the color feature value of each color block, determining whether the color block needs image enhancement; and if the color block needs the image enhancement, modifying a weight of each color channel in the apparatus color space according to the color feature value to provide modified data of each color channel,
  wherein the image-forming apparatus is further configured to output the modified data of each color channel onto a medium.

10. The apparatus according to claim 9, wherein the processor is further configured to:
  obtain the color band data to-be-processed in the apparatus color space of the image-forming apparatus; and
  perform binarization processing on the color band data to-be-processed.

11. The apparatus according to claim 10, wherein:
the apparatus color space of the image-forming apparatus includes C, M, Y and K color channels; and the processor is further configured to perform the binarization processing on color data of the C, M, Y and K color channels in the color band data to-be-processed using a Halftone algorithm to obtain binarized data corresponding to each color channel.

12. The apparatus according to claim 9, wherein the processor is further configured to:
  according to the binarized data of each color block in the C, M, Y and K color channels respectively, determine corresponding quantity of exposure points based on a quantity of pixel points with a non-zero pixel value.

13. The apparatus according to claim 9, wherein the processor is further configured to:
  convert the exposure point distribution image into a color image in a YCC color space.

14. The apparatus according to claim 13, wherein the processor is further configured to:
  calculate the color feature value corresponding to each color block based on a pixel coordinate and/or a pixel value of each pixel point in each color block.

15. The apparatus according to claim 9, wherein the processor is further configured to:
  according to the position information of each color block, perform a first determination to determine whether the color block is in a preset region; and if the color block is determined to be in the preset region, modify the weight of each color channel in the apparatus color space according to the color feature value, and output the modified data of each color channel according to the weight of each modified color channel.

16. The apparatus according to claim 9, wherein the processor is further configured to:
  according to the position information of each color block, perform a first determination to determine whether the color block is in a preset region; if the color block is determined to be not in the preset region, perform a second determination according to the color feature value to determine whether the color feature value satisfies a preset condition; and if the color feature value is determined to satisfy the preset condition, modify the weight of each color channel in the apparatus color space according to the color feature value, and output the modified data of each color channel according to the modified weight of each color channel.

17. A non-transitory computer-readable storage medium, wherein the storage medium includes a stored program; and when being executed, the program causes a processor to implement a color enhancement method, the method comprising:
  dividing color band data to-be-processed into a plurality of color blocks;
  counting a quantity of exposure points of each color channel of each color block in an apparatus color space, and generating an exposure point distribution image corresponding to each color block according to the quantity of exposure points of each color channel;
  converting the exposure point distribution image into a color image in a preset color space;
  calculating a color feature value corresponding to each color block according to the color image in the preset color space; and
  according to position information and/or the color feature value of each color block, determining whether the color block needs image enhancement; and if the color block needs the image enhancement, modifying a weight of each color channel in the apparatus color space according to the color feature value to provide modified data of each color channel, and outputting the modified data of each color channel onto a medium through an image forming apparatus.

18. The storage medium according to claim 17, wherein the processor is further configured to:
  obtain the color band data to-be-processed in the apparatus color space of the image-forming apparatus and performing binarization processing on the color band data to-be-processed, wherein:
    the apparatus color space of the image-forming apparatus includes C, M, Y and K color channels; and
    performing the binarization processing on the color band data to-be-processed includes performing the binarization processing on color data of the C, M, Y and K color channels in the color band data to-be-processed using a Halftone algorithm to obtain binarized data corresponding to each color channel.

19. The storage medium according to claim 17, wherein the processor is further configured to:

calculate the color feature value corresponding to each color block based on a pixel coordinate and/or a pixel value of each pixel point in each color block.

20. The storage medium according to claim 17, wherein the processor is further configured to:

according to the position information of each color block, perform a first determination to determine whether the color block is in a preset region; and if the color block is determined to be in the preset region, modify the weight of each color channel in the apparatus color space according to the color feature value, and output the modified data of each color channel according to the weight of each modified color channel; and/or according to the position information of each color block, perform a first determination to determine whether the color block is in a preset region; if the color block is determined to be not in the preset region, perform a second determination according to the color feature value to determine whether the color feature value satisfies a preset condition; and if the color feature value is determined to satisfy the preset condition, modify the weight of each color channel in the apparatus color space according to the color feature value, and output the modified data of each color channel according to the modified weight of each color channel.

* * * * *